(12) United States Patent
Harada

(10) Patent No.: US 9,285,010 B2
(45) Date of Patent: Mar. 15, 2016

(54) DAMPER DEVICE

(75) Inventor: Akinori Harada, Fujisawa (JP)

(73) Assignee: NIFCO INC., Yokohama-Shi, Kanagawa-Ken (JP)

( * ) Notice: Subject to any disclaimer, the term of this patent is extended or adjusted under 35 U.S.C. 154(b) by 0 days.

(21) Appl. No.: 14/232,032

(22) PCT Filed: Jul. 10, 2012

(86) PCT No.: PCT/JP2012/067616
§ 371 (c)(1),
(2), (4) Date: Jan. 28, 2014

(87) PCT Pub. No.: WO2013/011875
PCT Pub. Date: Jan. 24, 2013

(65) Prior Publication Data
US 2014/0151170 A1 Jun. 5, 2014

(30) Foreign Application Priority Data

Jul. 19, 2011 (JP) .................. 2011-157859

(51) Int. Cl.
*F16F 9/342* (2006.01)
*F16F 9/50* (2006.01)
*F16F 9/34* (2006.01)
*F16F 9/02* (2006.01)

(52) U.S. Cl.
CPC ... *F16F 9/50* (2013.01); *F16F 9/02* (2013.01); *F16F 9/0218* (2013.01); *F16F 9/34* (2013.01); *F16F 9/342* (2013.01)

(58) Field of Classification Search
CPC ......... F16F 9/02; F16F 9/0218; F16F 9/0209; F16F 9/0227; F16F 9/0281
USPC ....................... 188/322.15, 322.22; 267/64.22
See application file for complete search history.

(56) References Cited

U.S. PATENT DOCUMENTS

| | | | |
|---|---|---|---|
| 4,110,868 A * | 9/1978 | Imazaike | 16/84 |
| 4,741,518 A * | 5/1988 | Wallis | 267/75 |
| 5,275,387 A * | 1/1994 | Cotter et al. | 267/64.11 |
| 8,453,810 B2 | 6/2013 | Okabayashi | |
| 2005/0093213 A1* | 5/2005 | Jang | 267/120 |

(Continued)

FOREIGN PATENT DOCUMENTS

| | | |
|---|---|---|
| CN | 102066802 A | 5/2011 |
| JP | 2002-146861 A | 5/2002 |

(Continued)

OTHER PUBLICATIONS

Machine Translation of JP 2011-127648 (no date).*

(Continued)

*Primary Examiner* — Nicholas J Lane
(74) *Attorney, Agent, or Firm* — Manabu Kanesaka

(57) ABSTRACT

A damper device includes a protruding portion located outside a closing portion of a cylinder body facing a piston body and forming a flow path communicating inside and outside of the cylinder body; a plug body including a shaft portion inserted into the flow path from an outside of the cylinder body; and an urging device of the plug body. An insertion length of the shaft portion of the plug-like body into the flow path against urging of the urging device increases by change in pressure due to a movement or a relative movement of the piston body in a direction separating from the closing portion of the cylinder body.

4 Claims, 11 Drawing Sheets

(56) References Cited

U.S. PATENT DOCUMENTS

2006/0231991 A1 10/2006 Chun et al.
2009/0084645 A1* 4/2009 Okabayashi ............... 188/266.6

FOREIGN PATENT DOCUMENTS

| JP | 2008-275138 A | 11/2008 |
| JP | 2011-127648 A | 6/2011 |
| WO | 2006/112942 A2 | 10/2006 |
| WO | 2008/123198 A1 | 10/2008 |
| WO | 2011/037007 A1 | 3/2011 |

OTHER PUBLICATIONS

PCT, International Search Report for PCT/JP2012/067616.
Europe Patent Office, "Search Report for EP 12814453.2," Jun. 5, 2015.
China Patent Office, "Office Action for CN 201280045365.5," Feb. 2, 2015.

* cited by examiner

DAMPER DEVICE

FIELD OF TECHNOLOGY

The present invention relates to an improvement of a damper device comprising a cylinder body and a piston body, and allowing a braking force to act on a movement or a relative movement of an object to be braked by attaching at least one side of either the cylinder body or the piston body to the object to be braked.

BACKGROUND ART

In a damper device (called a piston damper and the like) comprising the cylinder body and the piston body, there is a damper device in which a ventilation path is formed in a closing portion of the cylinder body facing the piston body, and a shaft portion of a plug-like body is inserted into the ventilation path from an outside of the cylinder body. (See Patent Document 1)

In such a damper device, a forward movement of the piston body in a direction separating from the closing portion is allowed by an air intake through the ventilation path. As a forward movement speed of the piston body is faster, a difference in pressure between an inside and an outside of the cylinder body becomes greater, so that an insertion length of the shaft portion into the ventilation path increases. The more the insertion length increases, the more difficult the air intake through the ventilation path is carried out, so that a force necessary for the forward movement of the piston body, i.e., a braking force generated from the damper device, increases.

However, in such damper device, the ventilation path is formed by a tube-like portion protruding into the cylinder body from the closing portion by allowing one end of a tube to be communicated with a through hole formed in the closing portion of the cylinder body, so that in a position wherein the piston body has most approached the closing portion of the cylinder body, it is not necessarily easy to minimize a space generated between both members. If such space cannot be minimized, as soon as the forward movement in the direction separating from the closing portion starts from the position where the piston body has most approached the closing portion of the cylinder body, it becomes difficult to generate a change in pressure in such a way as to increase the insertion length of the shaft portion of the plug-like body into the ventilation path so as to deteriorate responsiveness of an initial movement of the damper device.

PRIOR ART DOCUMENT

Patent Document

Patent Document 1: Japanese Unexamined Patent Application Publication No. 2008-275138

SUMMARY OF THE INVENTION

Problems to be Solved by the Invention

A main object to be obtained by the invention is to further improve the responsiveness of this type of damper device.

Means for Solving the Problems

In order to obtain the aforementioned object, the present invention is a damper device including a cylinder body and a piston body, and allowing a braking force to act on a movement or a relative movement of an object to be braked by attaching at least one of either the cylinder body or the piston body to the object to be braked. The damper device comprises a protruding portion, forming a flow path communicating inside and outside of the cylinder body, outside a closing portion of the cylinder body facing the piston body; a plug-like body including a shaft portion inserted into the flow path from an outside of the cylinder body; and an urging device of the plug-like body. An insertion length of the shaft portion of the plug-like body into the flow path against urging of the urging device increases by change in pressure due to a movement or a relative movement of the piston body in a direction separating from the closing portion of the cylinder body.

The movement or the relative movement of the piston body in the direction separating from the closing portion of the cylinder body is allowed by an inflow of a fluid into the cylinder body from the flow path. Thereby, a force having a magnitude required for such movement or relative movement of the piston body is required so as to allow the aforementioned braking force to act. As a speed of the aforementioned movement or relative movement of the piston body increases, a space between the piston body and the closing portion of the cylinder body becomes more negative pressure, so as to increase the insertion length of the shaft portion into the flow path. As the insertion length increases, the inflow of the fluid through the flow path is more difficult so as to increase a force necessary for the aforementioned movement or relative movement of the piston body. Namely, the faster the speed of the movement or relative movement of the object to be braked becomes, the larger the braking force acted on the object to be braked by the damper device becomes. (A speed response) The flow path is formed outside the closing portion of the cylinder body by the protruding portion, so that in a position where the piston body has most approached the closing portion of the cylinder body, the space formed between both members can be minimized as small as possible. Thereby, from the position where the piston body has most approached the closing portion of the cylinder body, the movement or relative movement in the direction separating from the closing portion starts. Simultaneously, a change in pressure to increase the insertion length of the shaft portion of the plug-like body into the flow path can occur.

If a concave portion forming a convex portion inside the cylinder body is formed outside the closing portion of the cylinder body, and the protruding portion is provided inside the concave portion, while forming the flow path outside the closing portion of the cylinder body, a length of the cylinder body can be prevented from increasing.

In that case, furthermore, in the piston body, if a concave part, in which the convex portion formed inside the cylinder body can be housed, is formed, while providing the concave portion forming the convex portion inside the cylinder body, in the position where the piston body has most approached the closing portion of the cylinder body, the space formed between both members can be minimized as small as possible.

In the plug-like body, there may be formed a projection located on a lateral side of a base portion of the shaft portion, and abutting against a protruding end of the protruding portion when the insertion length of the shaft portion into the flow path has been maximized so as to prevent the flow path from being closed by the plug-like body. By doing so, even if the insertion length of the shaft portion into the flow path has been maximized, the inflow of the fluid into the cylinder body through the flow path can be ensured so as to allow the movement or the relative movement of the piston body in the direction separating from the closing portion of the cylinder body, and to prevent the movement of the object to be braked from abruptly halting due to the damper device.

There may be formed a circulating wall portion, which is on a center side of the closing portion more than an outer edge of the closing portion and surrounds the protruding portion, outside the closing portion of the cylinder body, and the-plug-like body is movably supported inside the circulating wall portion. In that way, the plug-like body can be formed to be as lightweight as possible. Therefore, an urging force of the urging device can also be minimized.

Effect of the Invention

According to the present invention, the responsiveness of the damper device comprising the cylinder body and the piston body can be appropriately improved without complication of structure thereof.

BEST MODES OF CARRYING OUT THE INVENTION

Figure 1:
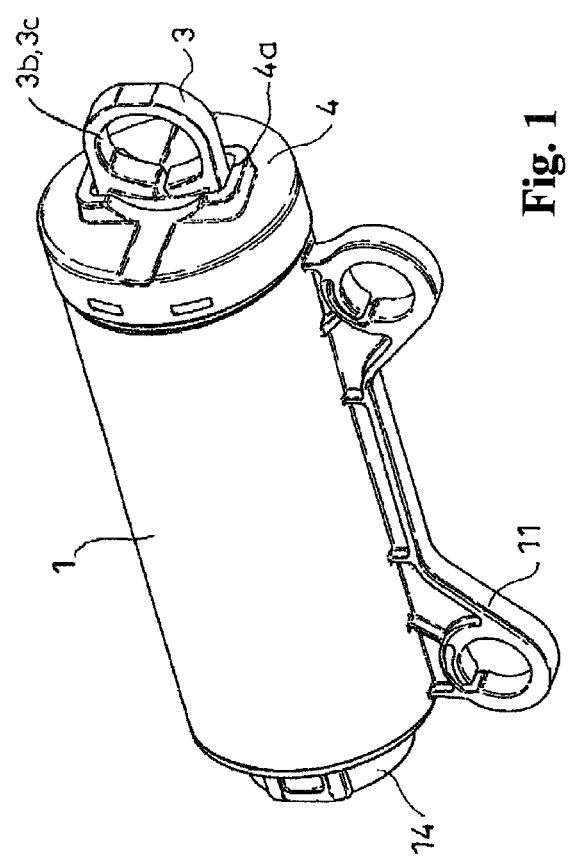
FIG. 1 is a perspective view of a damper device according to an embodiment of the present invention.

Hereinafter, a typical embodiment of the present invention will be explained with reference to FIG. 1 to FIG. 16. A damper device according to the embodiment comprises a cylinder body 1 and a piston body 2, and allows a braking force to act on a movement or a relative movement of an object to be braked by attaching at least one of either the cylinder body 1 or the piston body 2 to the object to be braked.

For example, if the piston body 2 is attached to the object to be braked as a movable body (omitted in the figures), and the cylinder body 1 is attached to a fixation body (omitted in the figures), the piston body 2 is moved by a movement of the object to be braked so as to allow a braking force to act on the movement of the object to be braked through the piston body 2. Contrary to that, if the cylinder body 1 is attached to the object to be braked as the movable body, and the piston body 2 is attached to the fixation body, the piston body 2 is relatively moved by the movement of the object to be braked so as to allow the braking force to act on the movement of the object to be braked through the cylinder body 1.

Also, if the piston body 2 is attached to the object to be braked as the movable body, and the cylinder body 1 is attached to the object to be braked as another movable body, both the cylinder body 1 and the piston body 2 are moved by a movement in a direction mutually approaching two objects to be braked, or a direction separating from each other so as to allow the braking force to act respectively on the movement of the two objects to be braked.

In the embodiment, the cylinder body 1 has substantively a cylindrical shape. One end of a cylinder of the cylinder body 1 is a closing portion 10 facing the piston body 2. The piston body 2 has a short cylinder shape having an outer outline shape which fits together with an inner outline shape of a cross-sectional face in a direction perpendicular to a cylinder shaft of the cylinder body 1. A front side 2a facing the closing portion 10 of the piston body 2 is open, and a back side 2b which is opposite to the front side 2a is closed. Also, in the back side 2b, there is integrally connected an inner end 3a of a piston rod 3. In the other end of the cylinder of the cylinder body 1, there is fitted a cap 4 comprising a passage opening 4a of the piston rod 3. In an illustrated example, in a lateral part of such cylinder body 1 and an outer end of the piston rod 3, there are respectively formed attachment portions 11 and 3c relative to the movable body or the fixation body.

The piston body 2 comprises a circular groove 2c in an outer circumferential part thereof. In the illustrated example, such circular groove 2c is formed between both a first outer flange 2d formed at a cylinder end of the front side 2a of the piston body 2 and a second outer flange 2e formed at a lateral part of the piston body 2 at a back more than the first outer flange 2d. In the circular groove 2c, there are fitted seal rings 2f, and the seal rings 2f seal between the outer circumferential part of the piston body 2 and an inner face of the cylinder body 1. A groove width of the circular groove 2c is larger than a width of the seal ring 2f. Thereby, the seal ring 2f contacts the first outer flange 2d forming one of groove walls of the circular groove 2c when the piston body 2 is moved (hereinafter, called moved forward) in a direction separating from the closing portion 10 of the cylinder body 1. On the other hand, when the piston body 2 is moved backward, the seal ring 2f contacts the second outer flange 2e forming the other of the groove walls of the circular groove 2c.

In the embodiment, the piston body 2 includes through holes 2g, allowing inside and outside of the piston body 2 to be communicated, in a groove bottom of the circular groove 2c respectively on both sides in a diametrical direction thereof. Such through holes 2g are formed on a side of the aforementioned first outer flange 2d. At a back of the through hole 2g, the second outer flange 2e is split and notched. Therewith, between such a split-notch portion 2h and the through hole 2g, there are formed two-piece ventilation grooves 2i and 2i along a moving direction of the piston body 2 on the groove bottom of the circular groove 2c. One end of the groove of the ventilation groove 2i is open in the split-notch portion 2h. Then, when the piston body 2 moves forward, the seal ring 2f blocks the through hole 2g, and an air intake to a space S between the piston body 2 and the closing portion 10 of the cylinder body 1 is carried out from an outside through the later-described flow path (in the embodiment, a ventilation path 13). On the other hand, when the piston body 2 moves backward, the seal ring 2f does not block the through hole 2g, and the air toward the back side 2b of the piston body 2 is exhausted through the through hole 2g and the ventilation groove 2i from the aforementioned space S. Thereby, in the embodiment, a constant force is required for a forward movement of the piston body. However, a backward movement thereof can be carried out with low resistance.

Also, the cylinder body 1 comprises a protruding portion 12, forming the ventilation path 13 allowing inside and outside of the cylinder body 1 to be communicated, in an outside 10a of the closing portion 10 facing the piston body 2. Therewith, the cylinder body 1 comprises a plug-like body 5 including a shaft portion 50 which is inserted into such ventilation path 13 from the outside of the cylinder body 1; and an urging device 6 of the plug-like body 5. Also, in the damper device according to the embodiment, a change in pressure, caused by the forward movement or a relative forward movement of the piston body 2, increases an insertion magnitude of the shaft portion 50 of the plug-like body 5 into the ventilation path 13 against urging of the urging device 6.

In the illustrated example, the protruding portion 12 has a circular tube shape, and one end thereof is integrally connected to the center of the closing portion 10. In the center of the closing portion 10, there is formed a through hole 10b, and air is taken into the aforementioned space S through the protruding portion 12 and the through hole 10b.

Also, in the illustrated example, the shaft portion 50 of the plug-like body 5 has a column shape, and is slightly longer than a length of the ventilation path 13. In a position where the shaft portion 50 of the plug-like body 5 has most inserted into the ventilation path 13, the shaft portion 50 of the plug-like body 5 has a length which allows an end thereof to be positioned in a hole opening on a side of the aforementioned space S of the through hole. (FIG. 4) An outer diameter of the shaft portion 50 is slightly smaller than an inner diameter of the ventilation path 13. Also, an outer end of the shaft portion 50 is integrally connected to the center of a head portion 51.

In the illustrated example, the head portion 51 of the plug-like body 5 includes an inner cylinder portion 51a and an outer cylinder portion 51d. The inner cylinder portion 51a is positioned outside the shaft portion 50, and the outer cylinder portion 51d is positioned outside the inner cylinder portion 51a with a circular interval therebetween. The shaft portion 50 integrally connects a base portion 50a to a cylinder outer end 51b (a cylinder end which is opposite to a cylinder inner end 51c facing the aforementioned closing portion 10) in which the inner cylinder portion 51a is closed. The shaft portion 50 has approximately twice the length of an entire length of the inner cylinder portion 51a, and protrudes to an outside from the cylinder inner end 51c in which the inner cylinder portion 51a is open. A circular connecting portion 51i is formed between an outside portion of the inner cylinder portion 51a and an inside portion of the outer cylinder portion 51d.

Also, in the illustrated example, there are formed projecting portions 51e facing the outside respectively on both ides in a diametrical direction of the outer cylinder portion 51d, which are cylinder outer ends of the outer cylinder portion 51d. Claw portions 51f are formed in projecting ends of the projecting portions 51e, and voids 51g are formed on an inward side of the claw portions 51f to allow an elastic deformation to the inward side at a formation portion of the claw portions 51f.

On the other hand, in the outside 10a of the closing portion 10 of the cylinder body 1, there is formed a circulating wall portion 14 which is on a center side of the closing portion 10 more than an outer edge 10c of the closing portion 10 and surrounds the aforementioned protruding portion 12. Inside the circulating wall portion 14, the plug-like body 5 is movably supported.

In the illustrated example, on both sides in a diametrical direction of the circulating wall portion 14, there are respectively formed window holes 14a. Then, the plug-like body 5 is supported inside the circulating wall portion 14 as mentioned above in such a way as to respectively insert the claw portions 51f into the two window holes 14a and 14a. More specifically, a distance between ends of a pair of claw portions 51f and 51f of the plug-like body 5 is slightly larger than an inner diameter of the circulating wall portion 14, and if the head portion 51 of the plug-like body 5 is operated to be inserted into the circulating wall portion 14 in such a way that the shaft portion 50 is inserted into the ventilation path 13 inside the protruding portion 12, the formation portion of the claw portion 51f elastically deforms as mentioned above so as to allow the claw portion 51f to be inserted into the circulating wall portion 14. Also, such claw portion 51f is inserted into the window hole 14a by elastically returning at the aforementioned formation portion so as to be hooked on the window hole 14a. Thereby, within a range of the window hole 14a, the plug-like body 5 is movably supported in the circulating wall portion 14. Incidentally, the reference 51h represents guide convex pieces formed on an outer face of the outer cylinder portion 51d of the plug-like body 5, and the reference 14b represents guide grooves formed on an inner face of the circulating wall portion 14 and in which the guide convex pieces can be housed.

On the other hand, in the illustrated example, the urging device 6 is formed by a compression coil spring 6a installed between the head portion 51 of the plug-like body 5 and an outer face portion of the closing portion 10. Specifically, such spring 6a is disposed in such a way as to house the aforementioned protruding portion 12 inside. Also, one end of the spring 6a abuts against the circular connecting portion 51i of the plug-like body 5, and the other end of the spring 6a abuts against the outer face portion of the closing portion 10. Then, by the spring 6a, in a state preventing the piston body 2 from moving forward, the plug-like body 5 is positioned in a movement prior position (FIG. 2) wherein the insertion length of the shaft portion 50 relative to the ventilation path 13 is minimal.

A movement or a relative movement in the direction separating from the closing portion 10 of the cylinder body 1 of the piston body 2, i.e., the aforementioned forward movement is allowed by an air intake into the cylinder body 1 from the ventilation path 13. Thereby, a force required for such movement or relative movement of the piston body 2 is required so as to act the aforementioned braking force.

Figure 2:
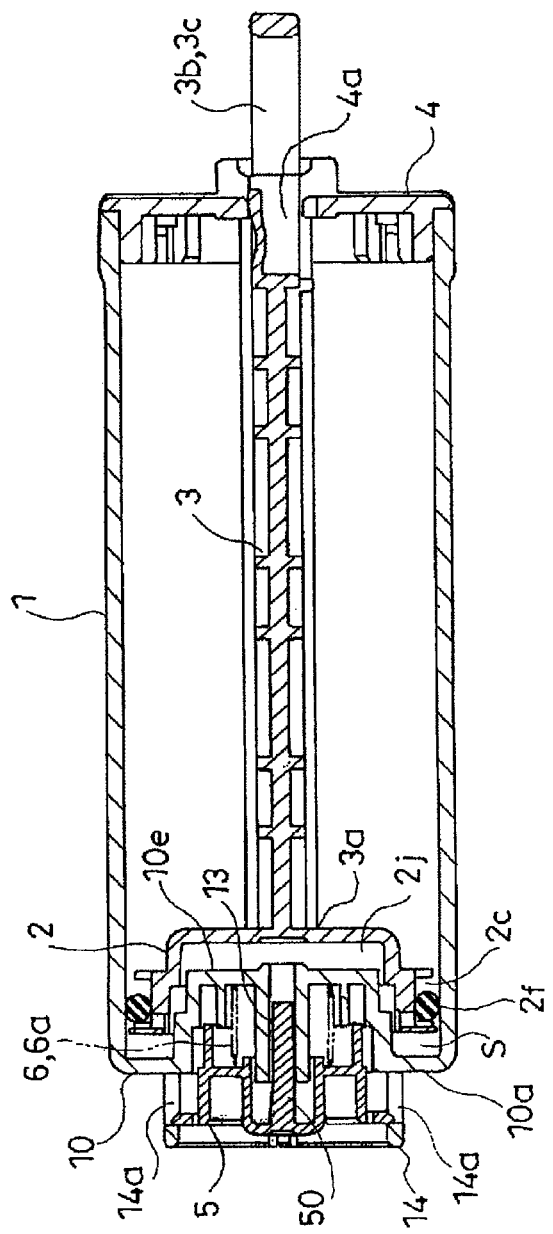
FIG. 2 is a cross-sectional view of the damper device according to the embodiment.
Figure 3:
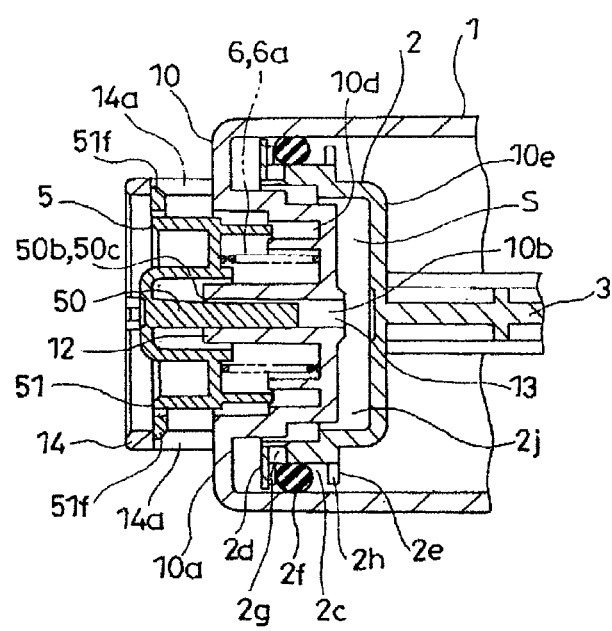
FIG. 3 is a cross-sectional view of essential parts in FIG. 2.

In the illustrated example, there are respectively formed gaps between the outer cylinder portion 51d of the plug-like body 5 and the circulating wall portion 14 or the later-described concave portion 10d; between the inner cylinder portion 51a of the plug-like body 5 and the protruding portion 12; and between the ventilation path 13 and the shaft portion 50, and by the gaps, the aforementioned air intake is carried out. (FIG. 2)

As the speed of the aforementioned movement or relative movement of the piston body 2 is faster, the space S between the piston body 2 and the closing portion 10 of the cylinder body 1 becomes more negative pressure so as to increase the insertion length of the shaft portion 50 into the ventilation path 13. The more the insertion length increases, the more difficult the air intake through the ventilation path 13 is carried out so as to enlarge a force necessary for the aforementioned movement or relative movement of the piston body 2. Namely, the faster the speed of the movement or relative movement of the object to be braked becomes, the larger the braking force acted on the object to be braked by the damper device becomes. (A speed response)

In the embodiment, the ventilation path 13 is formed in the outside 10a of the closing portion 10 of the cylinder body 1 by the protruding portion 12, so that in a position where the piston body 2 has most approached the closing portion 10 of the cylinder body 1, the space S formed between both members can be made as small as possible. Thereby, in the embodiment, from the position where the piston body 2 has most approached the closing portion 10 of the cylinder body 1, the movement or relative movement in the direction separating from the closing portion 10 starts. Simultaneously, a change in pressure to increase the insertion length of the shaft portion 50 of the plug-like body 5 into the ventilation path 13 occurs.

In the embodiment, the plug-like body 5 is supported inside the circulating wall portion 14 which is smaller than an outer diameter of the cylinder body 1, and can be formed as light-weight as possible. Therefore, an urging force of the urging device 6 can also be minimized. Thereby, when the aforementioned movement or relative movement of the piston body 2 has occurred, i.e., when the movement or relative movement of the object to be braked has occurred, an appropriate braking force can act on such object to be braked by moving the plug-like body 5 without a lag time. Also, when a change in the speed of the movement or relative movement of the object to be braked has occurred, in response to that, without the lag time, the plug-like body 5 is moved in a direction increasing the insertion length of the shaft portion 50 into the ventilation path 13, or in a direction reducing the insertion length, so that the damper device changes a magnitude of the braking force acted on the object to be braked.

Figure 4:
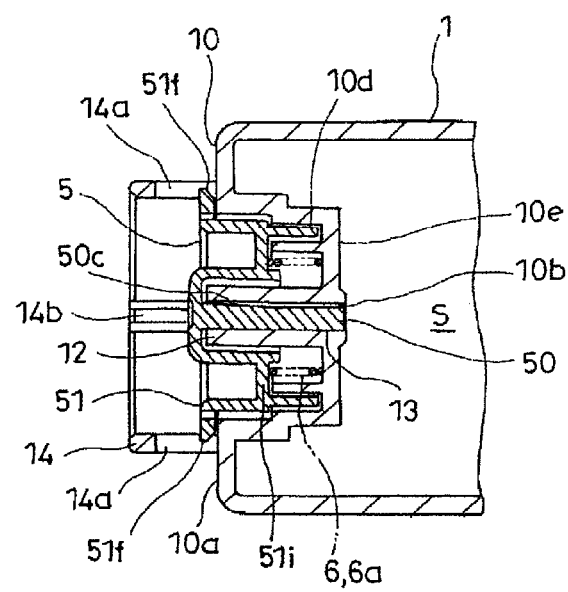
FIG. 4 is a cross-sectional view of essential parts showing a state wherein an insertion length of a shaft portion of a plug-like body into a ventilation path has been maximized by moving a piston body forward from a state in FIG. 2.
Figure 5:
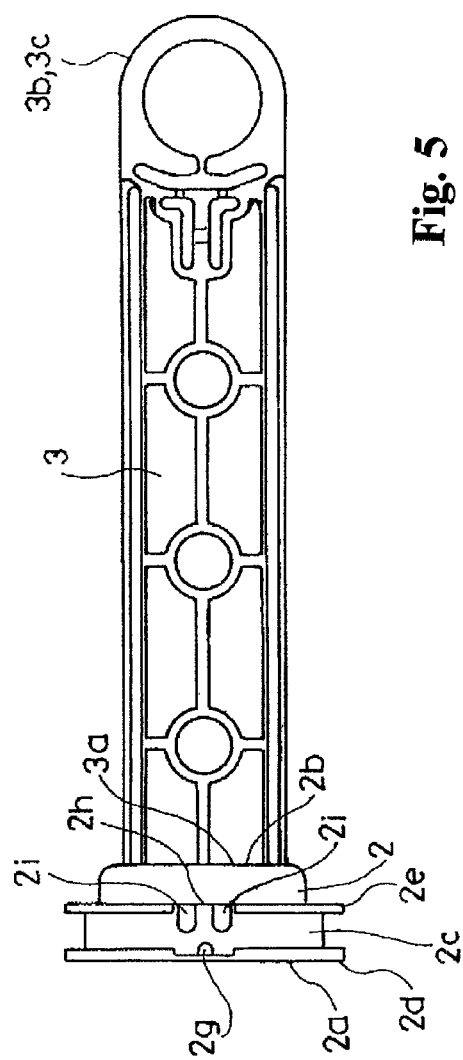
FIG. 5 is a side view of the piston body integrally comprising a piston rod, where a seal ring is omitted.
Figure 6:
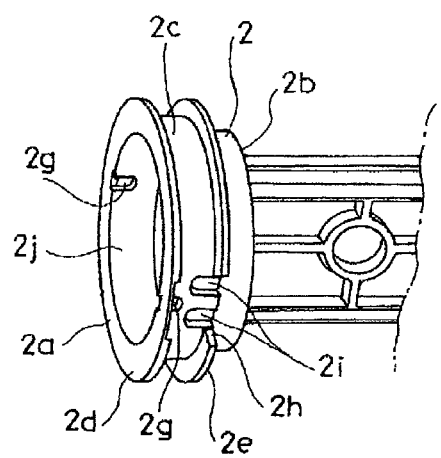
FIG. 6 is a perspective view of essential parts of the piston body integrally comprising the piston rod, where the seal ring is omitted.
Figure 7:
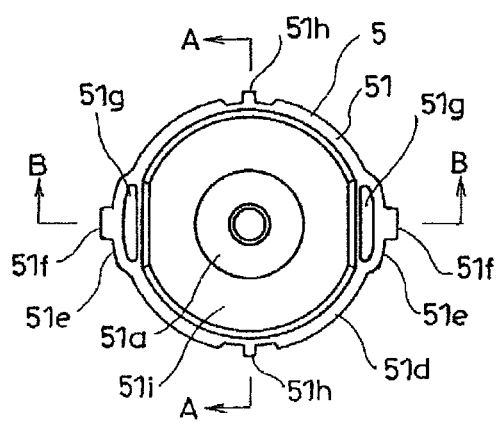
FIG. 7 is a front view of the plug-like body.
Figure 8:
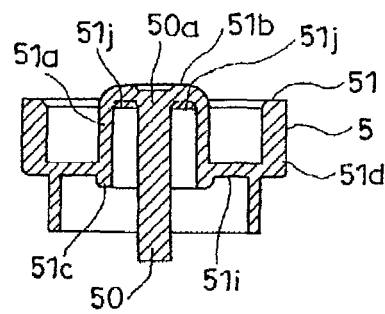
FIG. 8 is a cross-sectional view taken along a line A-A in FIG. 7.
Figure 9:
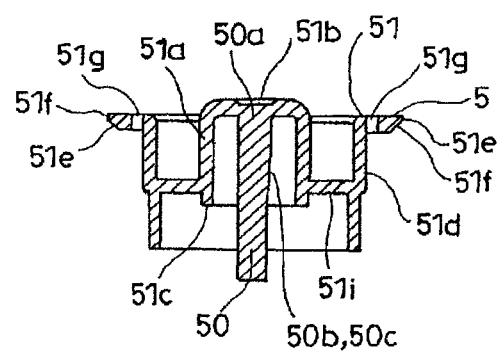
FIG. 9 is a cross-sectional view taken along a line B-B in FIG. 7.
Figure 10:
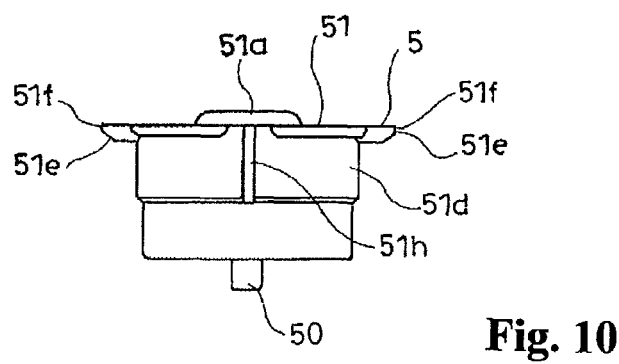
FIG. 10 is a side view of the plug-like body.
Figure 11:
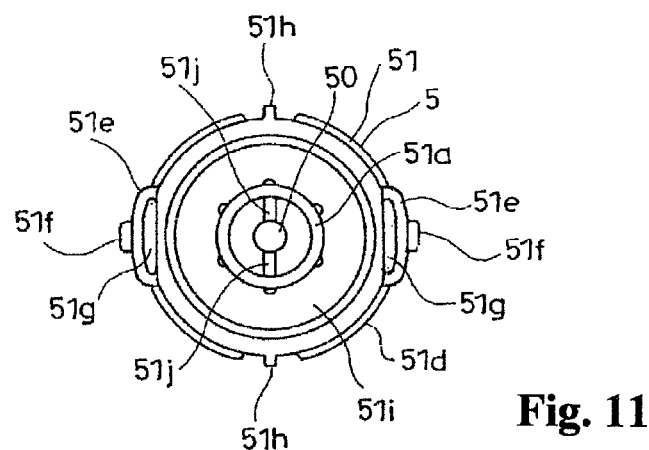
FIG. 11 is a rear view of the plug-like body.
Figure 12:
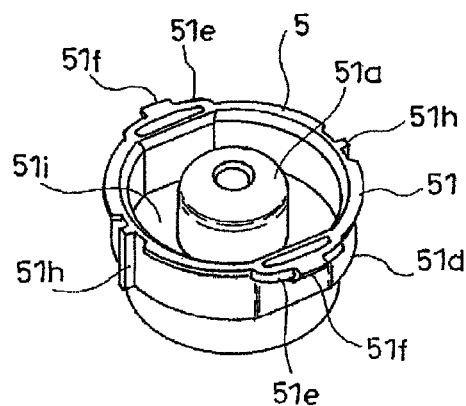
FIG. 12 is a perspective view of the plug-like body.
Figure 13:
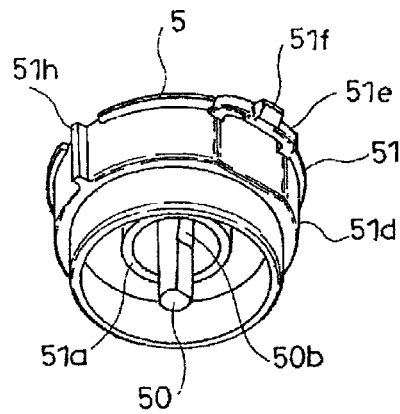
FIG. 13 is a perspective view showing the plug-like body viewed from a lower side in FIG. 12.
Figure 14:
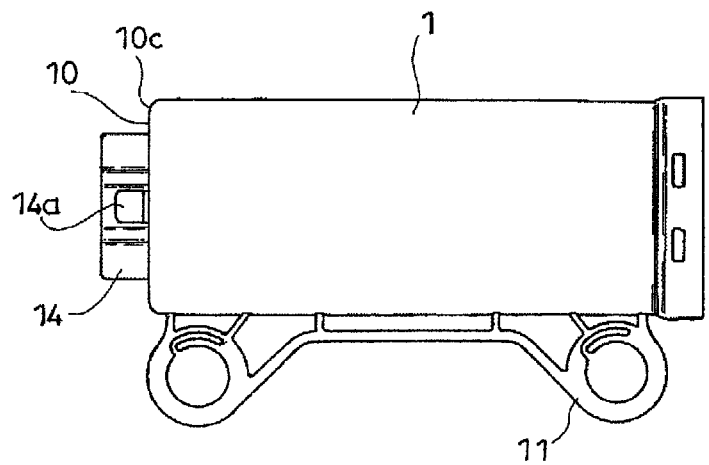
FIG. 14 is a side view of a cylinder body.
Figure 15:
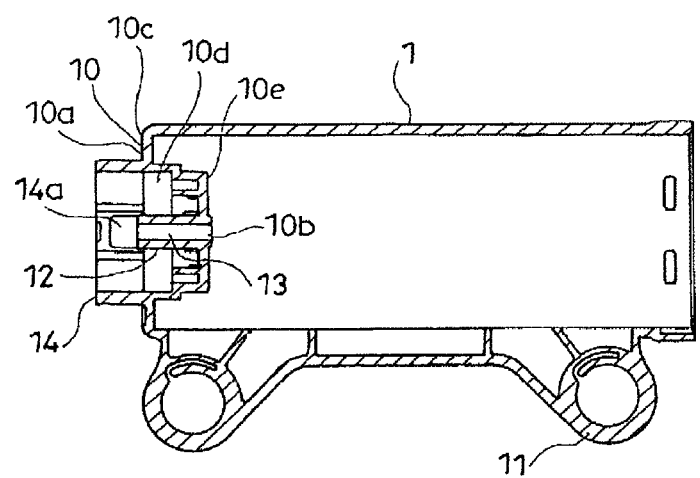
FIG. 15 is a cross-sectional view of the cylinder body.
Figure 16:
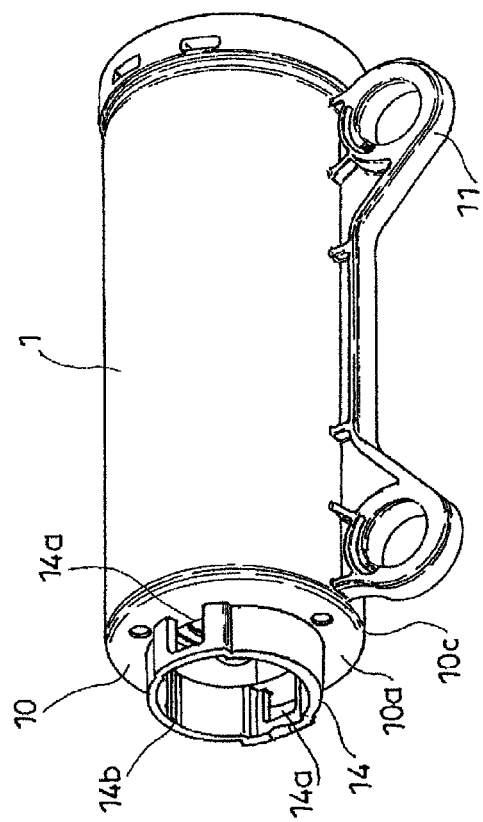
FIG. 16 is a perspective view of the cylinder body.

In the embodiment, in the lateral sides of the base portion 50a of the shaft portion 50 in the head portion 51 of the plug-like body 5, and in a portion abutting against a protruding end of the protruding portion 12 when the insertion length of the shaft portion 50 into the ventilation path 13 has been maximized, there are formed projections 51j preventing the ventilation path 13 from being closed by the plug-like body 5. In the illustrated example, in an inner face of the cylinder outer end 51b wherein the inner cylinder portion 51a is closed, there are respectively formed ribs as the projections 51j extending in a radiation direction from the base portion 50a of the shaft portion 50 in a symmetric position around the base portion 50a. When the insertion length of the shaft portion 50 into the ventilation path 13 has been maximized, the head portion 51 of the plug-like body 5 sticks to an entrance of the ventilation path 13 so as not to completely close the ventilation path 13. Thereby, in the embodiment, even if the insertion length of the shaft portion 50 into the ventilation path 13 has been maximized, a ventilating air into an inside of the cylinder body 1 through the ventilation path 13 is ensured so as to allow the movement or relative movement of the piston body 2 in the direction separating from the closing portion 10 of the cylinder body 1, and the movement of the object to be braked is prevented from abruptly halting due to the damper device. (FIG. 4)

Also, in the embodiment, in the shaft portion 50 of the plug-like body 5, there is formed a cut face 50b in which an outer outline shape of a cross-sectional face perpendicular to a shaft line of the shaft portion 50 from an end thereof to the vicinity of the base portion 50a has a D shape. Such cut face 50b is parallel to the shaft line of the shaft portion 50 up to approximately a middle position in a length direction thereof from the end of the shaft portion 50. However, the cut face 50b slopes between approximately the aforementioned middle position and the vicinity of the base portion 50a in such a way as to gradually separate from the shaft line as the cut face 50b approaches the base portion 50a. Thereby, the shaft portion 50 is formed to become thick as the shaft portion 50 approaches the base portion 50a between approximately the middle position in the length direction thereof and the vicinity of the base portion 50a. (Hereinafter, the above-mentioned portion of the shaft portion 50 is called as a gradual increase portion 50c of thickness.) Then, in the embodiment, in the aforementioned movement prior position, the shaft portion 50 of the plug-like body 5 prevents the gradual increase portion 50c from being inserted into the ventilation path 13. (FIG. 3) When the shaft portion 50 is inserted into the ventilation path 13 by the aforementioned forward movement of the piston body 2, the aforementioned gradual increase portion 50c of thickness is inserted into the ventilation path 13, and the more this insertion length increases, the more the gap between the shaft portion 50 and the ventilation path 13 is narrowed down so as to enlarge a force necessary for the forward movement of the piston body 2.

Also, in the embodiment, in the outside 10a of the closing portion 10 of the cylinder body 1, there is formed the concave portion 10d forming a convex portion 10e on an inner side of the cylinder body 1, and there is provided the protruding portion 12 inside the concave portion 10d. Thereby, while forming the ventilation path 13 in the outside 10a of the closing portion 10 of the cylinder body 1, a length of the cylinder body 1 is prevented from increasing. Also, in the embodiment, in the piston body 2, there is formed a concave part 2j in which the convex portion 10e formed on the inner side of the cylinder body 1 can be housed. In the embodiment, in the position where the piston body 2 has most approached the closing portion 10 of the cylinder body 1, the convex portion 10e is inserted into the piston body 2 from the open front side 2a of the piston body 2. Namely, in the embodiment, the inside of such piston body 2 functions as the concave part 2j. Thereby, in the embodiment, while providing the concave portion 10d forming the convex portion 10e on the inner side of the cylinder body in the position where the piston body 2 has most approached the closing portion 10 of the cylinder body 1, the space S formed between both members is set to be as small as possible. In the embodiment, the concave portion 10d is a circular dent forming an entrance of the circular concave portion 10d in the outside 10a of the closing portion 10 of the cylinder body 1. The convex portion 10e is a short column-shaped portion protruding to an inner side of the closing portion 10, and by the concave portion 10d and the convex portion 10e, a thickness of the closing portion 10 is approximately the same at any position. An outer diameter of the convex portion 10e and an inner diameter of the piston body 2; and a protruding size of the convex portion 10e and a size between an open edge of the front side 2a and a bottom of the piston body 2 approximately correspond.

All contents of the specification, claims, drawings, and abstract of Japanese Patent Application No. 2011-157859 filed on Jul. 19, 2011 are cited in their entireties herein and are incorporated as a disclosure of the specification of the present invention.

What is claimed is:

1. A damper device comprising:
   a cylinder body and a piston body, arranged to apply a braking force to act on a movement or a relative movement of an object to be braked by attaching at least one of either the cylinder body or the piston body to the object to be braked,
   a closing portion closing the cylinder body;
   a protruding portion forming a flow path, communicating inside and outside of the cylinder body, and protruding outside from the closing portion of the cylinder body;

a convex portion formed by the closing portion protruding inside the cylinder body;

a concave portion formed by the closing portion at a side opposite to the convex portion, the concave portion having the protruding portion therein;

a concave part in which the convex portion formed inside the cylinder body is housed, formed in the piston body;

a plug body including a shaft portion inserted into the flow path from an outside of the cylinder body; and an urging device arranged between the closing portion and the plug body, wherein an insertion length of the shaft portion of the plug body into the flow path against urging of the urging device increases by a change in pressure due to a movement or a relative movement of the piston body in a direction separating from the closing portion of the cylinder body, a space formed between the piston body and the closing portion becomes smallest when the piston body is positioned closest to the closing portion, and a projection is formed in the plug body, the projection being located on a lateral side of a base portion of the shaft portion and abutting against a protruding end of the protruding portion when the insertion length of the shaft portion into the flow path is maximized, to thereby prevent the flow path from being closed by the plug body.

2. A damper device according to claim 1, wherein a circulating wall portion, located on a center side of the closing portion more than an outer edge of the closing portion and surrounding the protruding portion, is formed outside the closing portion of the cylinder body, and the plug body is movably supported inside the circulating wall portion.

3. A damper device according to claim 1, wherein the piston body includes a front side facing the closing portion, a back side opposite to the front side and closing the piston body, a first outer flange surrounding the front side, a second outer flange situated away from the first outer flange, and a circular groove formed between the first and second outer flanges for receiving a seal ring therebetween, and the cylinder body has a portion between an inner periphery thereof and an outer periphery of the convex portion, receiving the first outer flange and the seal ring when the piston body is fully inserted into the cylinder body.

4. A damper device according to claim 3, wherein an outer diameter of the convex portion and an inner diameter of the piston body, and a protruding size of the convex portion and a size between an open edge of the front side and the back side of the piston body approximately correspond.

* * * * *